US012136772B2

(12) United States Patent
Fikes et al.

(10) Patent No.: US 12,136,772 B2
(45) Date of Patent: Nov. 5, 2024

(54) SELF-CALIBRATING PHASED-ARRAY TRANSCEIVER

(71) Applicant: California Institute of Technology, Pasadena, CA (US)

(72) Inventors: Austin C. Fikes, Pasadena, CA (US); Behrooz Abiri, Pasadena, CA (US); Florian Bohn, Pasadena, CA (US); Seyed Ali Hajimiri, La Canada, CA (US); Christopher Ian Walker, Berkeley, CA (US); David Elliot Williams, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 210 days.

(21) Appl. No.: 17/683,100

(22) Filed: Feb. 28, 2022

(65) Prior Publication Data

US 2023/0109403 A1 Apr. 6, 2023

Related U.S. Application Data

(63) Continuation of application No. 15/997,617, filed on Jun. 4, 2018, now Pat. No. 11,264,715.

(60) Provisional application No. 62/514,319, filed on Jun. 2, 2017.

(51) Int. Cl.
*H01Q 3/26* (2006.01)

(52) U.S. Cl.
CPC .................................. *H01Q 3/267* (2013.01)

(58) Field of Classification Search
CPC ...................................................... H01Q 3/267
See application file for complete search history.

(56) References Cited

U.S. PATENT DOCUMENTS 5,412,414 A 5/1995 Ast
5,657,023 A * 8/1997 Lewis .................... H01Q 3/267 342/174
11,264,715 B2 * 3/2022 Fikes .................... H01Q 3/267
2001/0005685 A1 6/2001 Nishimori
(Continued)

OTHER PUBLICATIONS

US Office Action dated Mar. 24, 2021, in U.S. Appl. No. 15/997,617.
(Continued)

*Primary Examiner* — Bernarr E Gregory
*Assistant Examiner* — Fred H Mull
(74) *Attorney, Agent, or Firm* — Weaver Austin Villeneuve & Sampson LLP

(57) ABSTRACT

A phased-array includes, in part, N transceivers each including a receiver and a transmitter, and a controller. The phased array is configured to transmit a first radio signal from a first element of the array during a first time period, receive the first radio signal from a second element of the array, recover a first value associated with the radio signal received by the second element, transmit a second radio signal from the second element of the array during a second time period, receive the second radio signal from the first element of the array, recover a second value associated with the radio signal received by the first element, and determine a first phase of a reference signal received by the second element from the recovered first and second values. The first phase is relative to a second phase of the reference signal received by the first element.

9 Claims, 5 Drawing Sheets

(56) References Cited

U.S. PATENT DOCUMENTS

| | | | | |
|---|---|---|---|---|
| 2006/0234694 | A1* | 10/2006 | Kawasaki | H01Q 3/267 455/423 |
| 2007/0099627 | A1 | 5/2007 | Kofol | |
| 2010/0315045 | A1 | 12/2010 | Zeine | |
| 2011/0319034 | A1* | 12/2011 | Boe | G01S 7/4017 455/67.14 |
| 2014/0167704 | A1 | 6/2014 | Lafontaine et al. | |
| 2014/0242914 | A1 | 8/2014 | Monroe | |
| 2019/0140349 | A1 | 5/2019 | Fikes et al. | |
| 2019/0219619 | A1 | 7/2019 | Walker et al. | |

OTHER PUBLICATIONS

US Notice of Allowance dated Oct. 25, 2021, in U.S. Appl. No. 15/997,617.

* cited by examiner

SELF-CALIBRATING PHASED-ARRAY TRANSCEIVER

CROSS REFERENCE TO RELATED APPLICATIONS

The present application is a continuation of application Ser. No. 15/997,617, filed Jun. 4, 2018, now U.S. Pat. No. 11,264,715 B2, and claims benefit under 35 USC 119(e) of Application Ser. No. 62/514,319 filed Jun. 2, 2017, the content of which is incorporated herein by reference in its entirety.

FIELD OF THE INVENTION

The present invention relates to phased-arrays, and more particularly to calibration of phased-arrays.

BACKGROUND OF THE INVENTION

Phased array systems have been widely used in radar and astronomy applications. The synthetic aperture provided by a phased-array system enables fast beam scanning when used in a radar system. When used in a radio telescope, a phased-array provides a relatively large receiving aperture.

Conventional systems for calibrating a phased-array rely on matching the length of the transmission lines that distribute the RF signal and the phase shift introduced by the RF components such as phase shifters, mixers, amplifiers, and the like. Due to process variation, temperature fluctuations, impedance mismatch of antenna feeds, coupling between antennas, and the like, the radiated phase from each antenna in the phased-array system will be different than what is intended if such effects are not taken into account.

One conventional system for calibrating the phase settings of the array elements relies on placing a probe either in the near field or far field of a phased-array to calibrate the phase settings. Such systems not only require the extra probe, but require the exact location of the extra probe to be known for calibration thus rendering the system more complicated.

Another conventional system for calibrating the phase settings of the array elements uses couplers or (transmitter/receiver) T/R switches to couple the outgoing power from the antenna to a calibration path. Such systems not only require a separate calibration path but also make the implicit assumption that the calibration paths themselves do not require calibration. The limitations on existing calibration methods for phased arrays have further prevented their adoption in systems where the array elements change their relative positions and timing.

BRIEF SUMMARY OF THE INVENTION

A self-calibrating phased-array, in accordance with one embodiment of the present invention, includes, in part, N transceivers each including a receiver and a transmitter, N being an integer greater than 1, and a controller. The phased-array is configured to transmit a first radio signal from a first element of the array during a first time period, receive the first radio signal from a second element of the array during the first time period, recover a first value associated with the radio signal received by the second element, transmit a second radio signal from the second element of the array during a second time period, receive the second radio signal from the first element of the array during the second time period, recover a second value associated with the radio signal received by the first element, and determine a first phase of a reference signal received by the second element from the recovered first and second values. The first phase is relative to a second phase of the reference signal received by the first element.

In one embodiment, the first value represents a phase. In another embodiment, the first value represents a timing data. In one embodiment, the first phase is defined by one half of a difference between the recovered first and second values. In one embodiment, the phased-array is further configured to determine a phase delay across a transmit path of each of the first and second elements. In one embodiment, the phased-array is further configured to determine a phase delay across a receive path of each of the first and second elements. In one embodiment, the first and second radio signals are modulated.

In one embodiment, the phased-array is further configured to determine a distance between the first and two elements. In one embodiment, the first element is disposed in a first device different from a second device in which the second element is disposed. In one embodiment, the phased-array is an ad-hoc phased-array formed between the first and second devices. In one embodiment, at least one of the first or second devices may be a drone, an airplane, a vehicle, a cell phone, or a satellite. In one embodiment, the controller and phased array are formed in the same semiconductor substrate. In another embodiment, the controller and phased array are formed on different semiconductor substrates.

A self-calibrating phased-array, in accordance with one embodiment of the present invention, includes, in part, N transceivers each including a receiver and a transmitter, N being an integer greater than 1, and a controller. The phased-array is configured to transmit from each element i of the array during an $i^{th}$ time period an $i^{th}$ radio signal, wherein i is an integer ranging from 1 to N, receive the $i^{th}$ radio signal at each of at least of a subset of the remaining elements of the array during the $i^{th}$ time period, recover delay values associated with the radio signals received by the at least first subset, and determine a phase of a reference signal received by each of the at least first subset from the recovered delay values. The phase being relative to a reference phase of a reference clock as received by the $i^{th}$ element of the array.

In one embodiment, the delay values represent phase shifts. In one embodiment, the delay values represent timing data. In one embodiment, the phase of the reference signal received by $j^{th}$ element of the array is defined by one half of a difference between a delay value recovered by the $(i+1)^{th}$ element in response to transmission of the $i^{th}$ radio signal from the $i^{th}$ element and a delay value recovered by the $i^{th}$ element in response to transmission of the $j^{th}$ radio signal by the $j^{th}$ element, where i and j are integers ranging from 1 to N.

In one embodiment, the phased-array is further configured to determine a phase delay across each of a transmit and receive path of the array elements in accordance with the recovered delay values and further in accordance with one or more initial values. In one embodiment, the phased-array is further configured to determine a phase delay across each of a transmit and receive path of the array elements in accordance with the recovered delay values and further in accordance with one or more known relationships between the phased array elements.

In one embodiment, the initial values represent known values associated with the phased array. In one embodiment, the initial values are obtained from computer simulation. In one embodiment, the first and second radio signals are modulated. In one embodiment, the phased-array is further configured to determine a distance between the array elements.

In one embodiment, a first group of the N elements are disposed in a first device different from a second device in which the second group of the N element are disposed. In one embodiment, the phased-array is an ad-hoc phased-array formed between the first and second devices. In one embodiment, at least one of the first or second devices may be a drone, an airplane, a vehicle, a cell phone, or a satellite.

In one embodiment, the phased-array is further configured to determine a phase delay across each of a transmit and receive path of the array elements in accordance with the recovered delay values and further in accordance with one or more known relationships between the phased array elements In one embodiment, the known relationship represents temperature variation relationships. In one embodiment, the known relationships represents process variation relationships. In one embodiment, the phased-array is further configured to determine a phase delay across each of transmit and receive paths using quadratic minimization to minimize deviation between the determined values and the initial values.

In one embodiment, the phased-array is further configured to trilaterate to further determine distances between the array elements. In one embodiment, the phased-array is further configured to determine the phases of the reference signal while at least a multitude of the array elements are in motion. In one embodiment, the phased-array is further configured to use the distances between the array elements to generate a flexible or conformal phased array. In one embodiment, the controller and phased array are formed in the same semiconductor substrate. In another embodiment, the controller and phased array are formed on different semiconductor substrates.

A method of calibrating a phased-array that includes N transceivers each having a receiver and a transmitter, and where N is an integer greater than 1, includes, in part, transmitting a first radio signal from a first element of the array during a first time period, receiving the first radio signal from a second element of the array during the first time period, recovering a first value associated with the radio signal received by the second element, transmitting a second radio signal from the second element of the array during a second time period, receiving the second radio signal from the first element of the array during the second time period, recovering a second value associated with the radio signal received by the first element, and determining a first phase of a reference signal received by the second element from the recovered first and second values. The first phase is relative to a second phase of the reference signal received by the first element.

In one embodiment, the first value represents a phase. In one embodiment, the first value represents timing data. In one embodiment, the first phase is defined by one half of a difference between the recovered first and second values.

In one embodiment, the method further includes, in part, determining a phase delay across a transmit path of each of the first and second elements. In one embodiment, the method further includes, in part, determining a phase delay across a receive path of each of the first and second elements. In one embodiment, the first and second radio signals are modulated.

In one embodiment, the method further includes, in part, determining a distance between the first and second elements. In one embodiment, the first element is disposed in a first device different from a second device in which the second element is disposed. In one embodiment, the method further includes, in part, forming the phased-array between the first and second devices on the fly. In one embodiment, at least one of the first or second devices may be a drone, an airplane, a vehicle, a cell phone, or a satellite.

A method of calibrating a phased-array that includes N transceivers each having a receiver and a transmitter, and where N is an integer greater than 1, includes, in part, transmitting from each element i of the array during an $i^{th}$ time period an $i^{th}$ radio signal, wherein i is an integer ranging from 1 to N, receiving the $i^{th}$ radio signal at each of at least a subset of remaining elements of the array during the $i^{th}$ time period, recovering delay values associated with the radio signals received by the at least first subset, and determining a phase of a reference signal received by each of the at least first subset from the recovered delay values, said phase being relative to a reference phase of a reference clock as received by the $i^{th}$ element of the array.

In one embodiment, the delay values represent phase shifts. In one embodiment, the delay values represent timing data. In one embodiment, the phase of the reference signal received by $j^{th}$ element of the array is defined by one half of a difference between a delay value recovered by the $j^{th}$ element in response to transmission of the $i^{th}$ radio signal from the $i^{th}$ element and a delay value recovered by the $i^{th}$ element in response to transmission of the $j^{th}$ radio signal by the $j^{th}$ element.

In one embodiment, the method further includes, in part, determining a phase delay across each of a transmit and receive path of the array elements in accordance with the recovered delay values and further in accordance with one or more initial values. In one embodiment, the method further includes, in part, determining a phase delay across each of a transmit and receive path of the array elements in accordance with the recovered delay values and further in accordance with one or more known relationships between the phased array elements.

In one embodiment, the initial values represent known values associated with the phased array. In one embodiment, the initial values are obtained from computer simulation. In one embodiment, the first and second radio signals are modulated. In one embodiment, the method further includes, in part, determining a distance between the array elements. In one embodiment, a first group of the N elements is disposed in a first device different from a second device in which the second group of the N element is disposed.

In one embodiment, the method further includes, in part, forming the phased-array between the first and second devices on the fly. In one embodiment, at least one of the first or second devices may be a drone, an airplane, a vehicle, or a cell phone. In one embodiment, the known relationship represents temperature variation relationship. In one embodiment, the known relationship represents process variation relationship. In one embodiment, the known relationship represents voltage variation relationship.

In one embodiment, the method further includes, in part, determining a phase delay across each of transmit and receive paths using quadratic minimization to minimize deviation between the determined values and the initial values. In one embodiment, the method further includes, in part, performing trilateration to further determine distances between the array elements. In one embodiment, the method further includes, in part, determining the phases of the reference signal while at least a multitude of the array elements are in motion. In one embodiment, the method further includes, in part, using the distances between the array elements to generate a flexible or conformal phased array.

DETAILED DESCRIPTION OF THE INVENTION

In accordance with one embodiment of the present invention, a phased-array includes a built-in controller configured to calibrate the phase, timing, and position of the array elements without using any extra calibration paths. The following description of the present invention is provided with reference to a phased-array each element of which includes a transmitter and a receiver operating at a frequency synchronized to a reference signal. It is understood that the reference signal may be at the same frequency or at a frequency different from the frequency at which the transmitter/receiver (transceiver) operates.

Although the following description of the present invention is provided with reference to phase delay calibration, it is understood that the embodiments of the present invention are equally applicable to time delay calibration. Because of phase wrapping, a phase shift of, e.g., 45° is indistinguishable from a phase shift of e.g., (45°+360°). For example, assume a pair of transceivers (elements) of a phased array both of which transmit a carrier signal at a phase of $\pi/2$ relative to a reference phase. However, the second transceiver may lag an entire cycle behind the first transceiver, meaning it is actually transmitting at $5\pi/2$ relative the reference. Therefore, while the pair of elements are phase delay matched, they are not time delay matched. Embodiments of the present invention are adapted to calibrate for phase delay, timing delay as well as positions of the array elements.

Embodiments of the present invention further measure and hence take into account and calibrate the degree of phase shift that occurs in distributing the reference signal. In the following description it is assumed that the reference signal is at the same frequency as the signal used to operate the transmitter and receiver disposed in each array element. It is understood, however, that the reference signal may be at a frequency different from the frequency at which the phased array transmitter/receiver elements operate.

Figure 1:
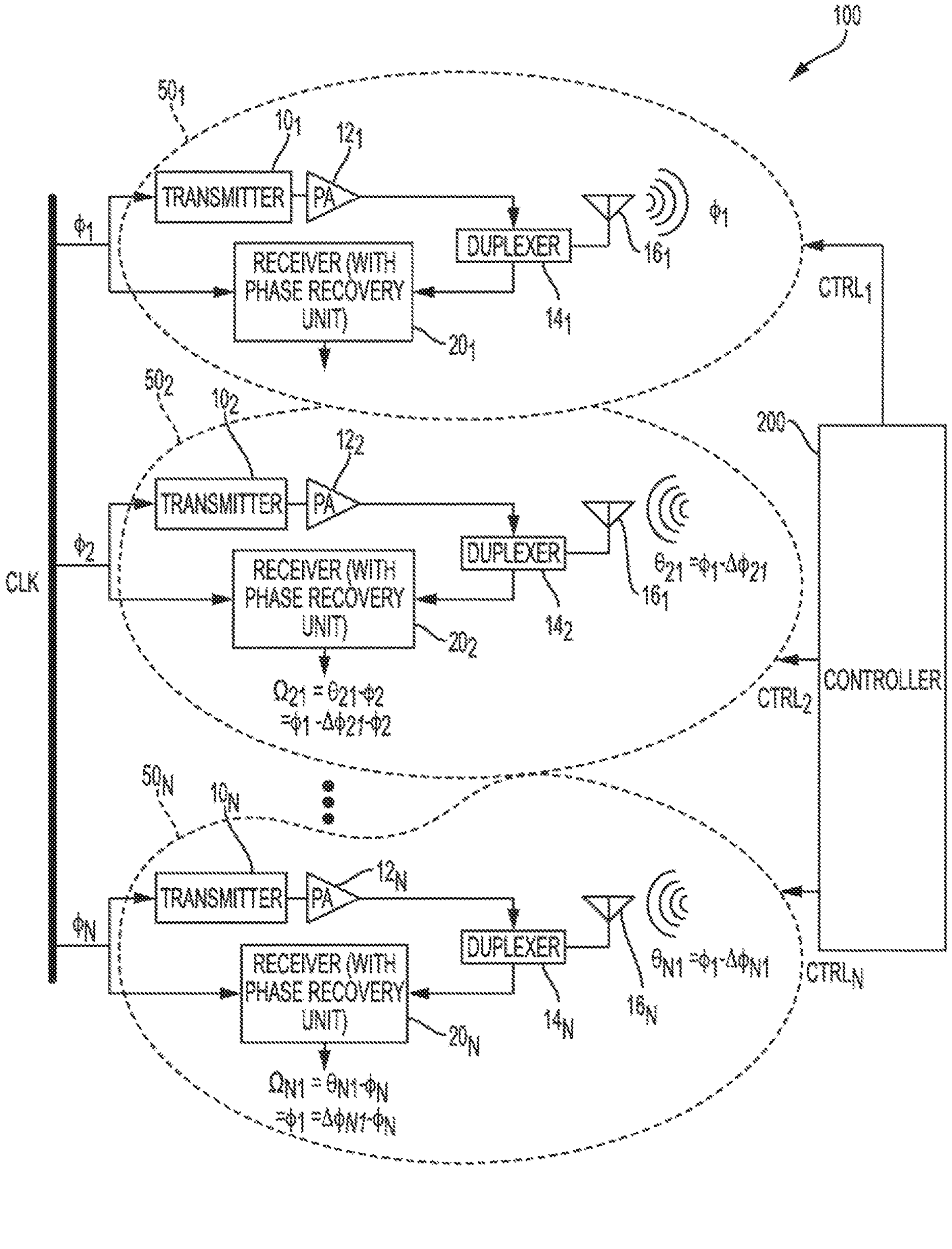
FIG. 1 is a simplified high-level schematic block diagram of a phased-array adapted to transmit and receive signals to self-calibrate, in accordance with one exemplary embodiment of the present invention.

FIG. 1 is a simplified high-level schematic block diagram of a phased-array 100 adapted to transmit and receive signals, in accordance with one embodiment of the present invention. Exemplary embodiment 100 of the phased array is shown as including a controller 200, and N transmit/receive element $\mathbf{50}_i$, where i is an integer ranging from 1 to N, in this exemplary embodiment and N is an integer greater than or equal to one. Each transmit/receive element (alternatively referred to herein as element) $\mathbf{50}_i$ is shown as including a transmitter $\mathbf{10}_i$, a power amplifier (PA) $\mathbf{12}_i$, a duplexer $\mathbf{14}_i$, a transmit/receive antenna $\mathbf{16}_i$ and a receiver with a phase recovery unit $\mathbf{20}_i$. Controller 200 is configured to control operations of transmit/receive element $\mathbf{50}_i$, as described further below. In one embodiment, controller 200 is formed and integrated in the same semiconductor substrate in which phased array 100 is formed. In yet other embodiment, controller 200 and phased array 100 are formed in different semiconductor substrates.

For example, element $\mathbf{50}_1$ is shown as including a transmitter $\mathbf{10}_1$, a PA $\mathbf{12}_1$, an optional duplexer $\mathbf{14}_1$, a transmit/receive antenna $\mathbf{16}_1$ and a receiver with a phase recovery unit $\mathbf{20}_1$. Likewise, element $\mathbf{50}_N$ is shown as including a transmitter $\mathbf{10}_N$, a PA $\mathbf{12}_N$, a duplexer $\mathbf{14}_N$, a transmit/receive antenna $\mathbf{16}_N$ and a receiver with a phase recovery unit $\mathbf{20}_N$. Embodiments of the phased array in which PAs $\mathbf{12}_i$ are adapted to be turned on and off may not include duplexers $\mathbf{14}_i$. Furthermore, although phased array 100 is shown having a one-dimensional array of elements, it is understood that a phased array, in accordance with embodiments of the present invention, may have a two-dimensional or three-dimensional array of elements.

As shown in FIG. 1, each element $\mathbf{50}_i$, receives a reference clock signal $\Phi_i$ used by the element to generate the transmit signal or recover the phase of the incoming signal received from the element's associated antenna $\mathbf{16}_i$. The phase of the clock signal CLK received by each element $\mathbf{50}_i$ is represented by $\Phi_i$. For example, the phase of the clock signal CLK received by element $\mathbf{50}_1$ is represented by $\Phi_1$; the phase of the clock signal CLK received by element $\mathbf{50}_2$ is represented by $\Phi_2$; and the phase of the clock signal CLK received by element $\mathbf{50}_N$ is represented by $\Phi_N$.

In the embodiment shown in FIG. 1, it is assumed, without loss of generality, that the phase of the signal transmitted by antenna $\mathbf{16}_i$ of element $\mathbf{50}_i$ is the same as the phase $\Phi_i$ of the clock signal received by that element $\mathbf{50}_i$. For example, the phase of the signal transmitted by antenna $\mathbf{16}_1$ of element $\mathbf{50}_1$ is assumed be $\Phi_1$; the phase of the signal transmitted by antenna $\mathbf{16}_2$ of element $\mathbf{50}_2$ is assumed be $\Phi_2$; and the phase of the signal transmitted by antenna $\mathbf{16}_N$ element $\mathbf{50}_N$ is assumed be $\Phi_N$.

The signal received by antenna $\mathbf{16}_i$ of element $\mathbf{50}_i$ is represented by $\theta_i$. For example, the phase of the signal received by antenna $\mathbf{16}_1$ is assumed be $\theta_i$; the phase of the signal received by antenna $\mathbf{16}_2$ is assumed be $\theta_2$; and the phase of the signal received by antenna $\mathbf{16}_N$ is assumed be $\theta_N$. Since receiver $\mathbf{20}_i$ of element $\mathbf{50}_i$ uses $\Phi_i$ as a reference phase to recover the phase of the signal it receives via its associated antenna $\mathbf{16}_i$, receiver $\mathbf{16}_i$ recovers a phase defined by $\Omega_i=\theta_i-\Phi_i$. Therefore, for example, the phase of the signal recovered by receiver $\mathbf{20}_1$ is represented by $\Omega_1=\theta_1-\Phi_1$; and the phase of the signal recovered by, for example, by receiver $\mathbf{20}_2$ is represented by $\Omega_2=\theta_2-\Phi_2$.

To calibrate phased array 100, in accordance with one embodiment of the present invention, controller 200 turns off all but one of the transmitters $\mathbf{10}_i$. In the following description it is assumed that controller 200 turns off all transmitters except transmitter $\mathbf{10}_1$. It is understood however that to perform calibration, in accordance with embodiments of the present invention, controller 200 may turn off all but any of the other transmitters, such as $\mathbf{10}_2$ or $\mathbf{10}_3$. As described above, for the embodiment shown in FIG. 1, it is assumed that the signal transmitted by antenna $\mathbf{16}_i$ has the same phase as the clock signal received by the antenna's associated transmitter $\mathbf{10}_i$. However, to carry out the calibration, controller 200 is further configured to vary the phases of the transmitted signals during calibration so as to ensure that the phase of the signal transmitted, e.g. by antenna $16_1$ is the same as the phase of the clock signal CLK received by antenna $16_1$'s associated transmitter $10_1$.

After turning on, e.g., transmitter $10_1$, and turning off the remaining (N−1) transmitters, the receiver of each of the remaining (N−1) elements in the array recovers the phase of the signal transmitted by, in this example, transmitter $10_1$. In the following, the first index used with any of the parameters Ω, θ, Φ refers to the corresponding element number in the array receiving a signal and the second index represents the element number in the array that transmits the signal so received. For example, the phase of the signal transmitted by element $50_1$ (via its associated antenna $16_1$) as recovered by element $50_2$ (via its associated receiver $20_2$) is represented by $\Omega_{21}$. Similarly, the phase of the signal recovered by element $50_j$ due to transmission of this signal by element $50_1$ is represented by $\Omega_{j1}$. In general, the phase of the signal recovered by element $50_m$ due to transmission of this signal by element $50_n$ is represented by $\Omega_{mn}$, where m and n are integers ranging from 1 to N for the embodiment shown in FIG. 1.

As was described above, the phase of the signal transmitted by antenna $16_1$ is assumed to be the same as the phase of the reference clock signal CLK received by element $50_1$ in which antenna $16_1$ is disposed. As described above, the phase of the signal transmitted by antenna $16_1$ and received by antenna $16_2$ is represented by $\theta_{21}$. Phase $\theta_{21}$ relative to the phase of the signal as it is transmitted by antenna $16_1$, namely $\Phi_1$, may be defined as:

$$\theta_{21}=\Phi_1-\Delta\Phi_{21} \quad (1)$$

where $\Delta\Phi_{21}$ represents the degree of phase shift that the signal transmitted by antenna $16_1$ experiences as it travels from antenna $16_1$ to antenna $16_2$.

The phase of the signal recovered by receiver $20_2$ is defined by a difference between the signal received by antenna $16_2$ and the phase of the reference clock CLK as received by element $50_2$. Therefore, the phase of the signal recovered by receiver $20_2$ may be defined as:

$$\Omega_{21}=\theta_{21}-\Phi_2 \quad (2)$$

Substituting for $\theta_{21}$ in equation (2) as it is defined in equation (1), $\Omega_{21}$ may be defined as:

$$\Omega_{21}=\Phi_1-\Delta\Phi_{21}-\Phi_2 \quad (3)$$

In a similar manner, the phase of the signal transmitted by antenna $16_1$ and received by $16_N$ is represented by $\theta_{N1}$. Phase $\theta_{N1}$ relative to the phase of the signal as it is transmitted by antenna $16_1$, namely $\Phi_1$, may be defined as:

$$\theta_{N1}=\Phi_1-\Delta\Phi_{N1} \quad (4)$$

where $\Delta\Phi_{N1}$ represents the degree of phase shift that the signal transmitted by antenna $16_1$ experiences as it travels from antenna $16_1$ to $16_N$.

The phase of the signal recovered by receiver $20_N$ is defined by a difference between the phase of the signal received by $16_N$ and the phase of the reference clock CLK as received by element $50_N$. Therefore, the phase of the signal recovered by receiver $20_N$ may be defined as:

$$\Omega_{N1}=\theta_{N1}-\Phi_N \quad (5)$$

Substituting for $\theta_{N1}$ in equation (5) as it is defined in equation (4), $\Omega_{N1}$ may be defined as:

$$\Omega_{N1}=\Phi_1-\Delta\Phi_{N1}-\Phi_N \quad (6)$$

Embodiments of the present invention use the principle of reciprocity of electromagnetic waves which require that the phase shift incurred by a wave propagating in a forward direction be equal to the phase shift incurred by the wave propagating in a reverse (backward) direction. Therefore, with reference to FIG. 1, the phase shift incurred by a wave propagating from, for example, element 1 to element i, namely $\Delta\Phi_{i1}$, in phased array 100 is substantially the same as the phase shift incurred by a wave propagating from element i to element 1, namely $\Delta\Phi_{1i}$.

As described above, the phase of the signal recovered by element i of the phased-array due to transmission from element 1 of the phased-array may be defined as:

$$\Omega_{i1}=\Phi_1-\Delta\Phi_{i1}-\Phi_i \quad (7)$$

Similarly, the phase of the signal recovered by element 1 of the phased-array due to transmission from element i of the phased-array may be defined as:

$$\Omega_{1i}=\Phi_i-\Delta\Phi_{1i}-\Phi_1 \quad (8)$$

Because $\Delta\Phi_{1i}=\Delta\Phi_{j1}$ as described above, by subtracting equation (7) from (8) and dividing the results by two, the following result is achieved:

$$\Phi_i-\Phi_1=\tfrac{1}{2}(\Omega_{1i}-\Omega_{i1}) \quad (9)$$

The propagation phase delay from element 1 to element i may be defined as:

$$\Delta\Phi_{i1}=\tfrac{1}{2}(\Omega_{1i}+\Omega_{i1}) \quad (10)$$

Therefore, in accordance with one embodiment of the present invention, by recovering the phase of the signal received by element i of the phased array due to transmission from any of the other elements, e.g., element j of the array, recovering the phase of the signal received by element j of the array due to transmission from element i of the array, and subtracting the phase recovered by element i from the phase recovered by element j, the difference between the phase of the reference clock signal as received by element i relative to the phase of the reference clock signal as received by element j, is obtained, as shown in equation (9)

In accordance with another embodiment of the present invention to further increase diversity and accuracy, at any given time period, signal transmission is performed by one of the N elements of the array (element j) and received at remaining (N−1) elements of the array. The phase of the signal received by each or a subset of the remaining (N−1) elements is then recovered by the element's associated receiver. For element i of the array, the recovered (or measured) phase is represented by $\Omega_{ij}$ (which is measured relative to the phase of their local reference clock).

Next, the transmitter associated with element i is turned off and one of the remaining (N−1) elements (e.g., element j+1) is turned on to transmit a radio signal. The phase of the transmitted signal is recovered by each or a subset of the remaining (N−1) elements. For element i of the array, the recovered (or alternatively referred to measured, determined or detected) phase is represented by $\Omega_{i(j+1)}$ which is measured relative to the phase of element i's local reference clock $\Phi_i$.

This process continues until each element (e.g., element m) of the array recovers (also referred to as determined or detected) the phase of the signal transmitted by another element (e.g., element n) of the array. The phase offset between the clock signals arriving at elements m and n of the array, namely $\Phi_m-\Phi_n$ is defined by the following: (as also described above)

$$\Phi_m-\Phi_n=\tfrac{1}{2}(\Omega_{nm}-\Omega_{mn}) \quad (11)$$

In the embodiments described above, it is assumed that no phase errors/uncertainties exit in the transmitter and the receiver and as such the controller calibrates for phase delays in the reference clock signal distribution network. However, embodiments of the present invention can also calibrate for phase errors/uncertainties in the transmit and receive paths.

Figure 2:
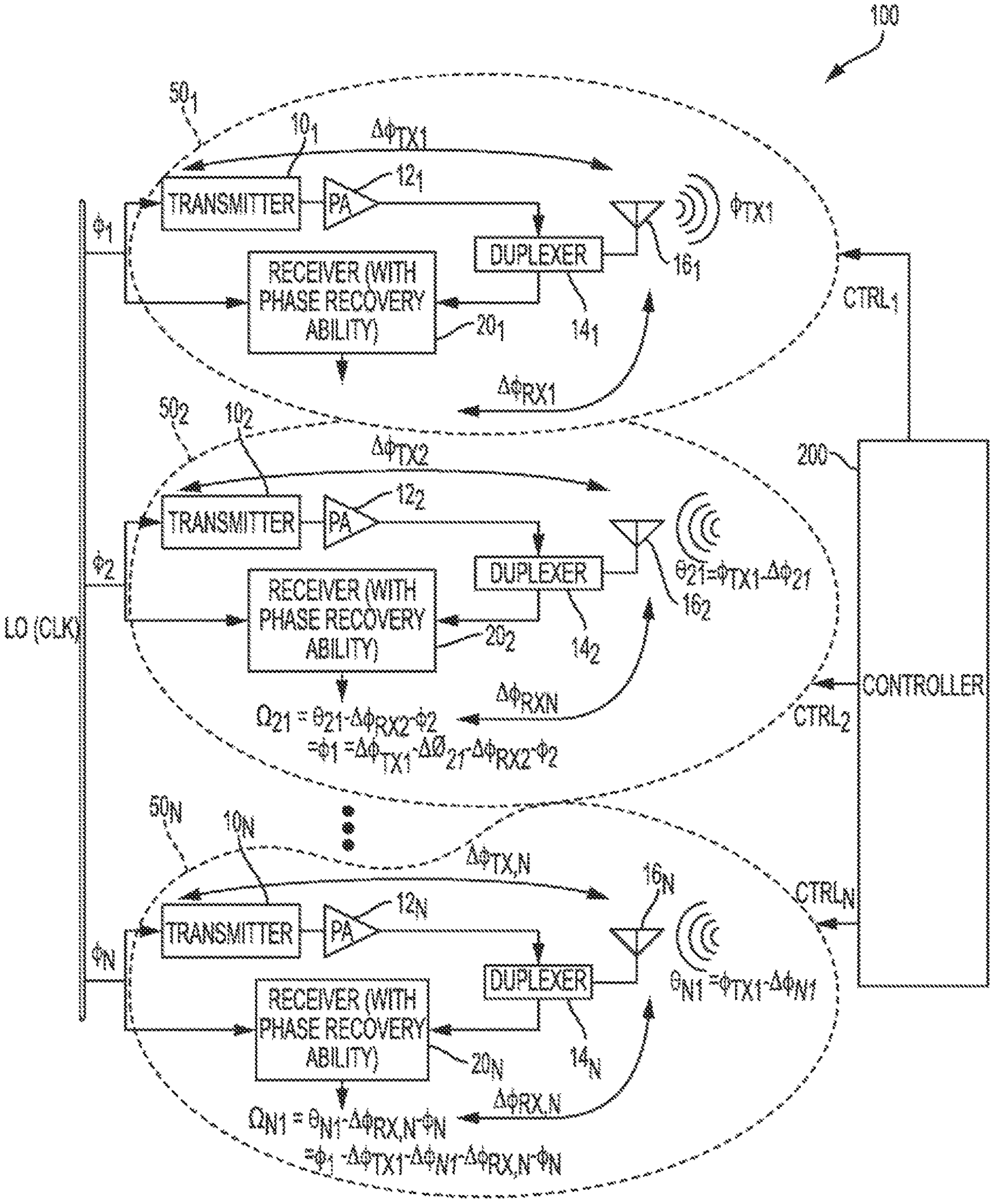
FIG. 2 is a simplified high-level schematic block diagram of a phased-array adapted to transmit and receive signals to self-calibrate, in accordance with one exemplary embodiment of the present invention.
Figure 3A:
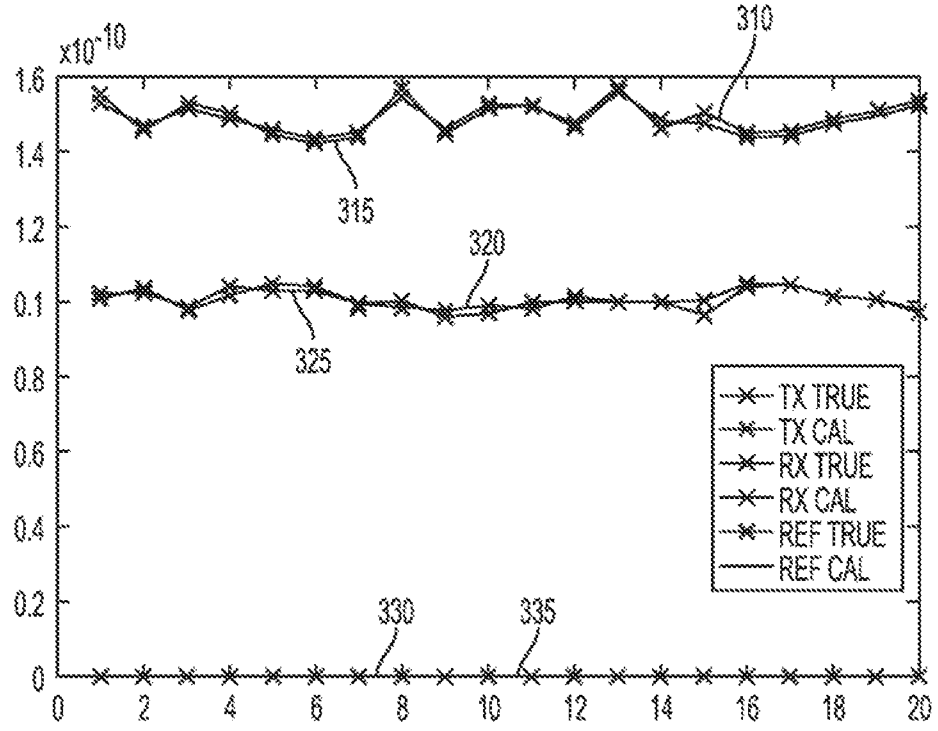
FIGS. 3A, 3B, 3C and 3D show plots of calibrated and predicted values obtained in accordance with one embodiment of the present invention.
Figure 3B:
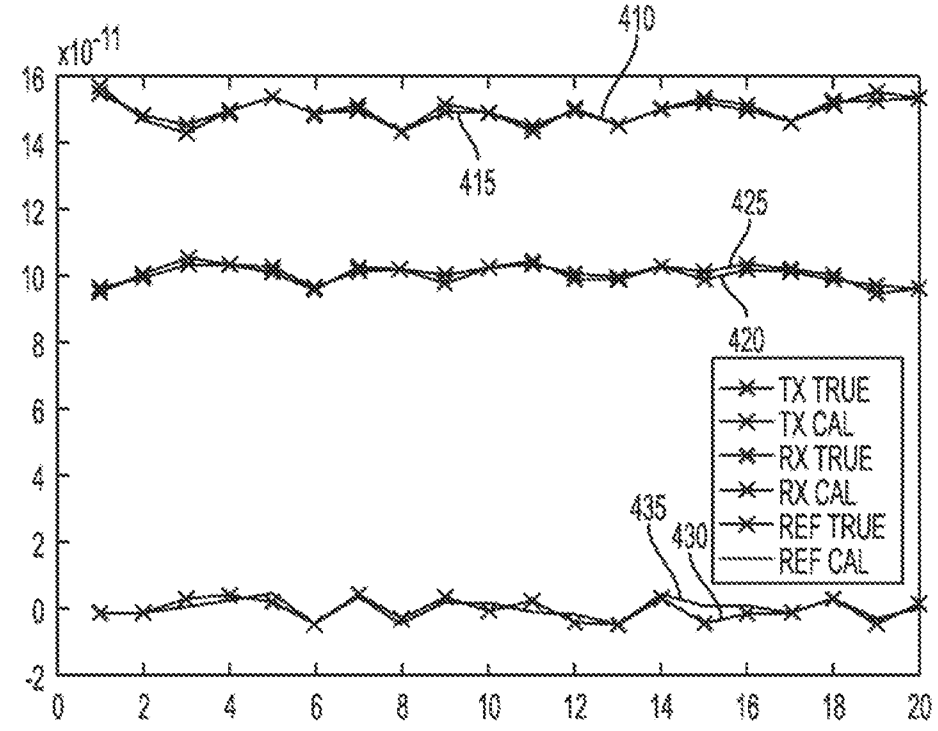
Figure 3C:
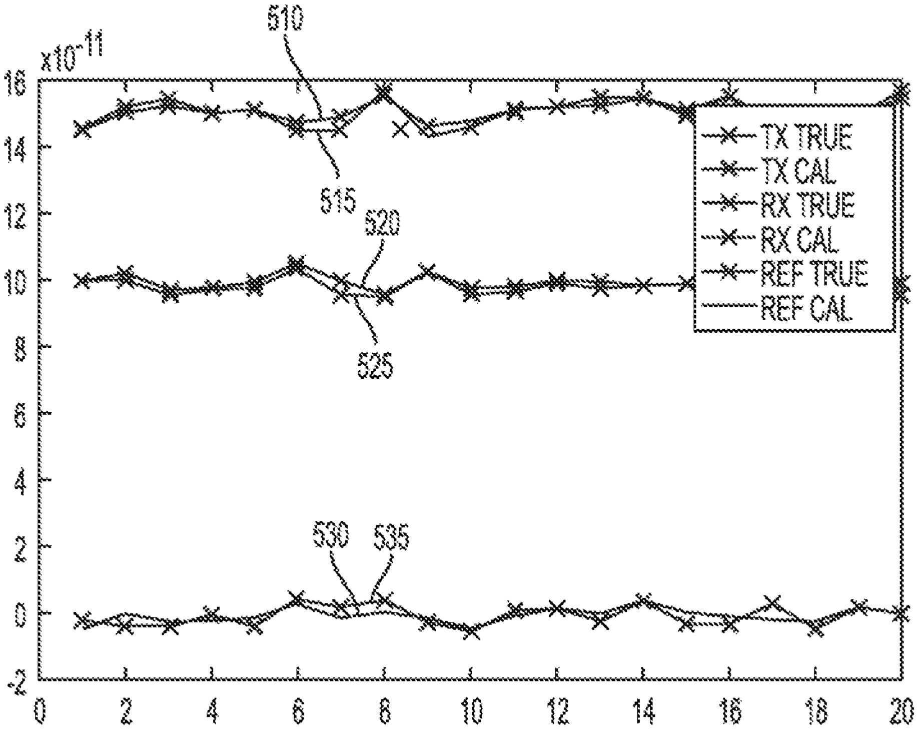
Figure 3D:
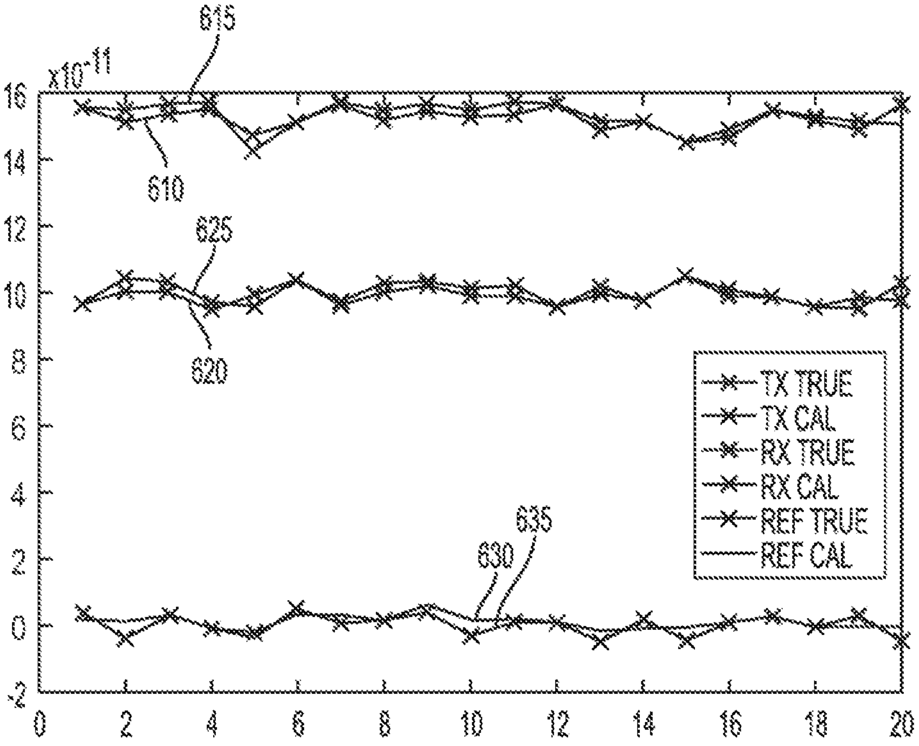

The phased-array shown in FIG. 2 is the same as that shown in FIG. 1, except that in FIG. 2, the phase delays in the transmit and receive paths of each element are also assumed as unknowns and denoted by $\Delta\Phi_{TXi}$ and $\Delta\Phi_{RXi}$, respectively. For example, the delays across transmit and receive paths in element 50$_1$ are respectively shown as $\Delta\Phi_{TX1}$ and $\Delta\Phi_{RX1}$.

Performing the same analysis as above, it is seen with these additional unknown delays, the phase recovered by, for example, receiver 20$_2$ due to transmission by, for example, antenna 16$_1$ may be represented as:

$$\Omega_{21}=\Phi_1-\Delta\Phi_{TX1}-\Delta\Phi_{21}-\Delta\Phi_{RX2}-\Phi_2 \quad (12)$$

In a similar manner, the phase recovered by receiver 20$_N$ due to transmission by antenna 16$_1$ may be represented by the following:

$$\Omega_{N1}=\Phi_1-\Delta\Phi_{TX1}-\Delta\Phi_{N1}-\Delta\Phi_{RXN}-\Phi_N \quad (13)$$

Assuming that $\Phi_1$ is known, it is thus seen that the number of unknowns in the system is the sum of (i) three times the number of elements minus one (since $\Phi_1$ is assumed to be known) in which the 3 unknowns are $\Phi_i$, $\Delta\Phi_{TXi}$, $\Delta\Phi_{RXi}$, and (ii) the number of $\Delta\Phi_{ij}$s which is equal to N(N−1)/2 (Divide by two is due to the fact that $\Delta\Phi_{ij}=\Delta\Phi_{ji}$). Hence the total number of unknowns is:

$$3N-1+\frac{N(N-1)}{2}=\frac{N^2}{2}+\frac{5}{2}N-1$$

The number of equations that can be formed is equal to number of $\Omega_{ij}$s which is equal to $N^2$. However, not all of these equations are linearly independent. Embodiments of the present invention provide additional techniques to solve all the unknowns. In one embodiment, to solve for internal transceiver delays, the $\Omega_{ii}$ measurements (referred to herein as self-loop measurements according to which the receiver of a unit i recovers the phase of the signal transmitted by unit i) are used, as shown below:

$$\Omega_{ii}=(\Phi_i+\Delta\Phi_{TXi})-(\Phi_i+\Delta\Phi_{RXi})=\Delta\Phi_{TXi}-\Delta\Phi_{RXi} \quad (14)$$

By using $\Omega_{ii}$, $\Omega_{jj}$, $\Omega_{ij}$, and $\Omega_{ji}$, it is seen that in accordance with the embodiments of the present invention described above, controller 100 can solve and determine the values of all $\Delta\Phi_{ij}$s in the system. Embodiments of the present invention provide a number of techniques to solve the other unknowns, namely $\Phi_i$, $\Delta\Phi_{TXi}$, $\Delta\Phi_{RXi}$.

In accordance with first such technique, embodiments of the present invention solve for the remaining unknowns ($\Phi_i$, $\Delta\Phi_{TXi}$, $\Delta\Phi_{RXi}$) by predicting the value of any one of these unknowns. In one embodiment, the predicted values may be obtained from simulated or previously measured values.

For example, an integrated circuit transceiver phased array may include temperature, process and voltage variation compensation circuitry in its receive paths. Such compensation circuitry is adapted to account for phase delay variation in the receive path and thus ensures that $\Delta\Phi_{RXi}=\tau$ for all elements i. Using the self-loop measurement, the $\Delta\Phi_{TXi}$ values can thus be determined as shown below:

$$\Delta\Phi_{TXi}=\Omega_{ii}+\Delta\Phi_{RXi}=\Omega_{ii}+\tau \quad (14)$$

With the internal delays, $\Delta\Phi_{TXi}$, and $\Delta\Phi_{RXi}$, known, as shown above, parameters $\Phi_i$s may be determined using the same approach as described above with reference to the transceiver shown in FIG. 1.

In accordance with a second technique, embodiments of the present invention determine the remaining unknowns by using a non-measured linear or nonlinear equations to perform the calibration, as described further below.

If an integrated circuit transceiver phased array does not include compensation circuitry in its receive paths, parameters $\Delta\Phi_{TXi}$ and $\Delta\Phi_{RXi}$ may change significantly with process and temperature variations. However, the changes in the transmit and receive path delays are strongly correlated. In such embodiments, a circuit simulation software such as SPICE may be used to determine the relationship between the delays in the transmit and receive paths of the same transceiver element. Assume that using the simulation, it is determined that the delay across the receive path of element i, namely $\Delta\Phi_{RXi}$, is related to the delay across the delay across the transmit path of element i, namely $\Delta\Phi_{TXi}$ by a constant, α, as shown below:

$$\Delta\Phi_{RXi}=\alpha*\Delta\Phi_{TXi} \quad (16)$$

By using the self-loop measurement, as described above, together with equation (14) and description above, the internal delays may be determined as shown further below:

$$\Delta\Phi_{TXi}=\Omega_{ii}+\Delta\Phi_{RXi}=\Omega_{ii}+\alpha*\Delta\Phi_{TXi}=\Omega_{ii}/1-\alpha \quad (17)$$

$$\Delta\Phi_{RXi}=\alpha*\Omega_{ii}/1-\alpha \quad (18)$$

Once the internal delays are known, as described above, the remaining unknown $\Phi_i$s parameters may be found, as described above. Such a technique may be used with any non-measured equation (such as equation 16) relating unknowns that is independent from the existing linear equations from the measurements.

In accordance with a third such technique, a mathematical optimization is used to estimate the solution rather than adding equations to reach a single exact solution. Even with no additional calibration circuitry, compensation circuitry or analytical relationships, an accurate estimate of the solution may be found using optimization. A simple implementation using quadratic minimization is demonstrated in the following simulated example. The example shown below calibrates the time delay of the array rather than the phase delay. It is understood that the embodiments of the present invention and the techniques described herein are equally applicable to time, phase and distance calibration.

Assume that the array to be calibrated is a four element transceiver array, i.e., N in FIGS. 1 and 2 is equal to 4. To use quadratic minimization, a predicted (e.g., an initial value) value for each unknown parameter is used. For the example below, assume that the actual value of each unknown parameter is randomly generated to be within +/−10% of the predicted value. The calibration process, in accordance with one aspect of the present invention, generates values that are as close to the actual value as possible. The following Table I summarizes the initial (predicted) and the actual (or assumed) values of the parameters:

TABLE I

| Transceiver | $\Phi_i$ | | $\Delta\Phi_{TXi}$ | | $\Delta\Phi_{RXi}$ | |
|---|---|---|---|---|---|---|
| Number | Predicted | Actual | Predicted | Actual | Predicted | Actual |
| 1 | 0 ps | 0 ps | 100 ps | 101.9 ps | 150 ps | 145.9 ps |
| 2 | 0 ps | 4.961 ps | 100 ps | 102.5 ps | 150 ps | 156.2 ps |
| 3 | 0 ps | −4.218 ps | 100 ps | 99.5 ps | 150 ps | 144.8 ps |
| 4 | 0 ps | −0.573 ps | 100 ps | 95.8 ps | 150 ps | 154.9 ps |

It is seen that $\Phi_1=0$ in Table I, indicating that the phase of signal CLK at the input of the first elements of the array is used as a reference phase and that the all delays determined by the calibration are relative to $\Phi_1$. It is understood however that the phase at any other element $\Phi_i$ may be used as a reference phase. Using the predicted values and the system of equations from the $\Omega_{ij}$ measurements, a quadratic minimization is performed. The following Table II summarizes the calibrated values as determined in accordance with embodiments of the present invention.

TABLE II

| Transceiver | $\Phi_i$ | | $\Delta\Phi_{TXi}$ | | $\Delta\Phi_{RXi}$ | |
|---|---|---|---|---|---|---|
| Number | Calibrated | Actual | Calibrated | Actual | Calibrated | Actual |
| 1 | 0 ps | 0 ps | 102.4 ps | 101.9 ps | 145.8 ps | 145.9 ps |
| 2 | 6.58 ps | 4.961 ps | 101 ps | 102.5 ps | 155.5 ps | 156.2 ps |
| 3 | −4.661 ps | −4.218 ps | 100.1 ps | 99.5 ps | 145.2 ps | 144.8 ps |
| 4 | −0.082 ps | −0.573 ps | 95.1 ps | 95.8 ps | 154.8 ps | 154.9 ps |

While the calibrated values are not the same as exact actual values, they are accurate when compared to the uncalibrated predicted values. In generating FIGS. 3A, 3B, 3C and 3D, described further below, the same quadratic minimization technique is performed in 20 trials, each with randomly generated variation in the unknowns. Plots 310, 315, 320, 325, 330 and 335 respectively show the calibrated and actual (e.g., assumed or predicted) values for each of parameters $\Delta\Phi_{RXi}$, $\Delta\Phi_{TXi}$, and $\Phi_i$, for the first transceiver of the 4-element phased array described in Table I. Plots 410, 415, 420, 425, 430 and 435 respectively show the calibrated and actual (e.g., assumed or predicted) values for each of parameters $\Delta\Phi_{RXi}$, $\Delta\Phi_{TXi}$, and $\Phi_i$, for the second transceiver of the 4-element phased array described in Table I. Plots 510, 515, 520, 525, 530 and 535 respectively show the calibrated and actual (e.g., assumed or predicted) values for each of parameters $\Delta\Phi_{RXi}$, $\Delta\Phi_{TXi}$, and $\Phi_i$, for the third transceiver of the 4-lement phased array described in Table I. Plots 610, 615, 620, 625, 630 and 635 respectively show the calibrated and actual (e.g., assumed or predicted) values for each of parameters $\Delta\Phi_{RXi}$, $\Delta\Phi_{TXi}$, and $\Phi_i$, for the fourth transceiver of the 4-element phased array described in Table I. The plots shown in FIGS. 3A, 3B, 3C and 3D demonstrate the accuracy of the calibration technique, in accordance with embodiments of the present invention.

Figure 4:
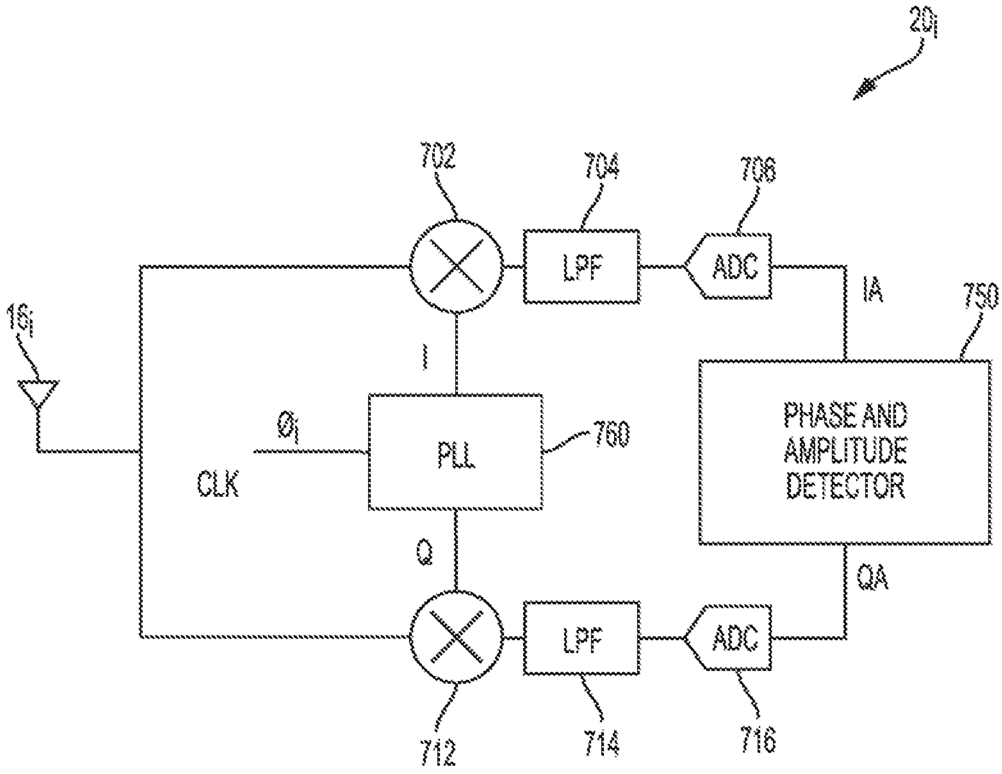
FIG. 4 is a simplified high-level schematic block diagram of a receiver with phase recovery unit, in accordance with one exemplary embodiment of the present invention.

FIG. 4 is a simplified high-level schematic block diagram of a receiver with phase recovery unit $\mathbf{20}_i$ as disposed in any one of the elements $\mathbf{50}_i$ of phased array 100 of FIG. 1, in accordance with one exemplary embodiment of the present invention. Mixers 702 and 704 are configured to convert the frequency of the radio signal received by any antenna $\mathbf{16}_i$ to a baseband signal in accordance with the in-phase signal I and quadrature signal Q generated by phase locked-loop 760. Phased-locked 760 is configured to generate the I and Q signal using the reference clock signal CLK, as is also shown in FIGS. 1 and 2. The baseband signal generated by mixer 702 is filtered using low-pass filter 704 and converted to a digital signal IA using analog-to-digital converter 706. Likewise, the baseband signal generated by mixer 712 is filtered using low-pass filter 714 and converted to a digital signal QA using analog-to-digital converter 716. Amplitude and phase detector 750 receives signals IA and QA and in response generates signals A and P representative of the phase and amplitude of the radio signal received by the antenna 16. The detected phase P is determined relative to the phase $\Phi_i$ of clock signal CLK.

Although the above embodiments of the present invention are described with reference to phase calibration, it is understood that the embodiments of the present invention apply equally to timing calibration when the phase unit is replaced with a time unit. A time delay may be measured by modulating the reference signal and sending frequency modulated continuous wave (FMCW) signals similar to those used in radar.

In addition to calibrating internal and reference delays, time delay calibration, in accordance with embodiments of the present invention, may be used to determine the relative distances between the elements of a phased array. To achieve this, the propagation times between elements ($\Delta\Phi_{ij}$s) is converted to distance knowing the propagation speed of the signal, which is the speed of light when the radio signals travel though free space. The distance between elements i and j is thus defined by $\upsilon*\Delta\Phi_{ij}$. With relative distances between elements known, trilateration can be used to determine relative position of all the elements in the array.

Position calibration enables the formation of dynamic phased arrays where the timing and position of transceivers (i.e., phased array elements) are changing. Mechanically flexible and conformal arrays are an example of dynamic phased arrays. These arrays may deform thus resulting in changes in the relative positions of their elements. The changes in position may be dynamically determined by the calibrating techniques, described above in accordance with embodiments of the present invention. Furthermore, because the calibration of phase/time/position in accordance with embodiments of the present invention is performed dynamically and at relatively high speeds, the array elements continue to stay calibrated as the array deforms and its elements move.

Moreover, because the calibration of phase/time/position in accordance with embodiments of the present invention is performed dynamically and with high speed, embodiments of the present invention may be used to form a phased array with transceiver elements that are spread across multiple flying/moving vehicles/objects. For example, a multitude of drones carrying transceivers and locked to the same reference may form a dynamic phased array, in accordance with embodiments of the present invention, when the timing and position of the drones' transceivers are calibrated in flight. Similarly, a dynamic phased array, in accordance with embodiments of the present invention, is formed between transceivers located in groups of independently flying spacecraft and/or airplanes.

Therefore, any set of transceivers that can use a shared reference signal may be calibrated together, in accordance with embodiments of the present invention, to form a dynamic phased array. This enables the formation of an ad-hoc phased array having transceivers disposed on difference devices (personal electronics, vehicles, etc.) that fall within a given range. In other words, embodiments of the present invention enable the formation of an ad-hoc dynamic phased-array on-the-fly between transceivers disposed on different devices, for example, between two cell phones, or two vehicles, or between a cell phone and a drone.

The above embodiments of the present invention are illustrative and not limitative. The embodiments of the present invention are not limited by the number of transmitting elements or receiving elements. The above embodiments of the present invention are not limited by the wavelength or frequency of the signal. The above embodiments of the present invention are not limited by the type of circuitry used to detect the phase of a received signal. The above embodiments of the present invention are not limited by the number of semiconductor substrates that may be used to form a phased array. Other modifications and variations will be apparent to those skilled in the art and are intended to fall within the scope of the appended claims.

What is claimed is:

1. A self-calibrating phased-array comprising a controller and N transceivers each comprising a receiver and a transmitter, N being an integer greater than 1, the phased array being configured to:

transmit from each element i of the array during an $i^{th}$ time period an $i^{th}$ radio signal, wherein i is an integer ranging from 1 to N;

receive the $i^{th}$ radio signal at each of at least a subset of remaining elements of the array during the $i^{th}$ time period;

recover delay values associated with the radio signals received by the at least first subset; and determine a phase of a reference signal received by each of the at least first subset from the recovered delay values, said phase being relative to a reference phase of a reference clock as received by the $i^{th}$ element of the array.

2. The self-calibrating phased-array of claim 1 wherein said delay values represent phase shifts.

3. The self-calibrating phased-array of claim 1 wherein said delay values represent timing data.

4. The self-calibrating phased-array of claim 3 wherein said first and second radio signals are modulated.

5. The self-calibrating phased-array of claim 1 wherein the phase of the reference signal received by $(i+1)^{th}$ element of the array is defined by one half of a difference between a delay value recovered by the $(i+1)^{th}$ element in response to transmission of the $i^{th}$ radio signal from the $i^{th}$ element and a delay value recovered by the $i^{th}$ element in response to transmission of the $(i+1)^{th}$ radio signal by the $(i+1)^{th}$ element.

6. The self-calibrating phased-array of claim 1 wherein the phased-array is further configured to determine a phase delay across each of a transmit and receive path of the array elements in accordance with the recovered delay values and further in accordance with one or more initial values.

7. The self-calibrating phased-array of claim 6 wherein said initial values represent known values associated with the phased array.

8. The self-calibrating phased-array of claim 6 wherein said initial values are obtained from computer simulation.

9. The self-calibrating phased-array of claim 1 wherein the phased-array is further configured to determine a phase delay across each of a transmit and receive path of the array elements in accordance with the recovered delay values and further in accordance with one or more known relationships between the phased array elements.

* * * * *